Patented Jan. 25, 1944

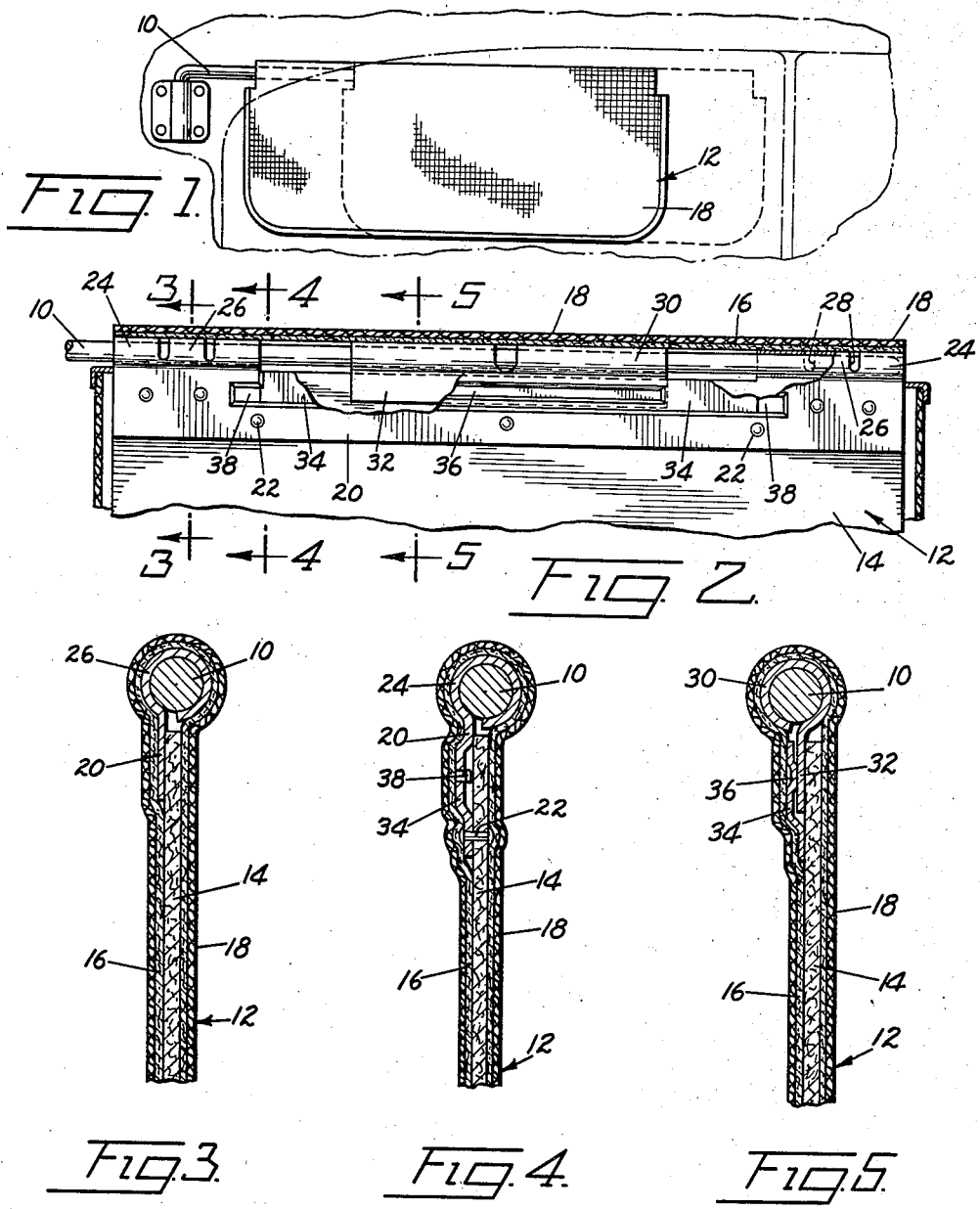

2,340,015

UNITED STATES PATENT OFFICE 2,340,015

VISOR CONSTRUCTION

Walter J. Pelcher and Alton J. Diroff, Monroe, Mich., assignors to Woodall Industries Incorporated, Detroit, Mich., a corporation of Michigan Application June 19, 1940, Serial No. 341,256

2 Claims. (Cl. 296—97)

This invention relates to improvements in visor structures and particularly to that type of visor which is used as a glare shield or sun visor within the interior of a motor vehicle body.

The object is to provide a visor of the character described which is so constructed and supported that it may be moved from an out of the way position to a plurality of relatively angularly disposed use positions. The visor may also be moved lengthwise throughout a permitted range of adjustment to obstruct light rays passing through the windshield into the vehicle at different points transversely of the windshield. Due to its adaptability for angular and longitudinal adjustment it is possible to use a visor of normal size which will obstruct the rays of the sun passing through the windshield of the vehicle throughout an area of substantially greater size than that of the visor itself.

Generally a visor of this character is disclosed in application Serial No. 325,298, now Patent 2,294,317, issued August 25, 1942, assigned to the assignee of the instant application. The instant application describes a visor which differs from that of the earlier filed application in respects which will hereinafter more fully appear. Generally the visor assembly comprises a supporting rod journalled at one end in a conventional manner for swinging movement to a position overlying the windshield or to a position overlying a side window. A visor panel is supported on this rod.

The panel is provided with longitudinal adjustment supporting means so engaging the rod as to permit longitudinal adjustment of said means along the rod and maintenance of said positions of adjustment. Such means so engages the rod as to permit rotatable adjustment of the panel about the rod but its grip upon the rod is insufficient to maintain said positions of rotatable adjustment.

The panel is also provided with rotatable adjustment supporting means so engaging the rod as to permit rotatable adjustment of said means about the rod and maintenance of said positions of adjustment. Said means is not longitudinally adjustable along the rod but will permit longitudinal adjustment of the panel relative to said means.

A meritorious feature is that the longitudinal adjustment supporting means and the rotatable adjustment supporting means comprise generally similar tubular portions resiliently embracing the rod. Each such tubular portion is adjustable rotatably about the rod. The tubular portion of the rotatable adjustment means is adapted to maintain itself and the panel at adjusted positions of rotation about the rod but its engagement with the rod is too great to permit of its ready manual adjustment longitudinally of the rod. The tubular portion of the longitudinal adjustment supporting means is adapted to maintain its positions of longitudinal adjustment along the rod but its engagement with the rod is too slight to maintain, under all use conditions, the panel at positions of its rotatable adjustment about the rod.

Other objects, advantages and meritorious features of the construction will more fully appear from the following description, appended claims, and accompanying drawing, wherein:

Figure 1 is an elevation of my improved visor structure mounted upon a conventionally supported rod 10 within the interior of a vehicle, Fig. 2 is a longitudinal sectional view through the visor mounting upon the rod, Fig. 3 is a cross section taken on line 3—3 of Fig. 2, Fig. 4 is a cross-section taken on line 4—4 of Fig. 2, and Fig. 5 is a cross section taken on line 5—5 of Fig. 2.

The rod 10 may be supported at one end in any conventional manner for swivelling from a position in front of the windshield to a position overlying a side window opening. The visor panel assembly indicated as 12 is mounted upon the rod for rotatable adjustment thereabout to different angular positions and for longitudinal adjustment therealong.

The visor panel itself may comprise an inner foundation element 14 which may be formed of Masonite or any other suitable material. As covering for the foundation I have shown a multi-ply assembly which may consist of a sheet 16 of material, such as flexible asphalt impregnated board and a layer 18 of trim cloth, artificial leather, or the like. This two ply sheet may be wrapped about the Masonite foundation and the metal strip 20 which is secured to the Masonite foundation along its upper margin.

In Fig. 2 this strip is shown as riveted at 22 to the Masonite. It may be secured thereto by wire stitching or in any other suitable fashion. The strip 20 is provided with tubular end portions 24. Each tubular end portion 24 has a central section 26 partially separated from the remainder of the end portion by cut-outs 28 as shown in Fig. 2. This section 26 is curled to engage the rod 10 more closely than the end portions on each side thereof which are freely journalled upon the rod.

The engagement of the section 26 of each end journal with the rod is such that the visor panel may be moved lengthwise upon the rod against this resisted frictional engagement and will resistingly maintain itself at positions of such longitudinal adjustment. This engagement is such as to permit rotatable angular adjustment of the panel about the rod but the frictional engagement of the portion 26 with the rod is ordinarily not sufficient as to retain the panel at positions of rotatable adjustment against the jar and shock of road travel which would tend to dislocate it angularly from an elevated position.

To maintain the panel at positions of rotatable adjustment there is provided a tubular gripping element 30 which is shown as embracing the rod between the end portions 24 of the panel. This element 30 has a lip 32 that extends between the foundation panel 14 and the metal strip 20 as shown in Fig. 5. It will be noted that the metal strip 20 is stamped or crimped outwardly as at 34 for a portion of its length. This outwardly stamped portion has a bead 36 projecting inwardly to establish the frictional engagement with the lip 32 of the element 30 as shown in Figs. 2 and 5. The outwardly stamped portion 34 provides the necessary clearance for travel over the lip 32 of the element 30.

At each end of the outwardly crimped portion 34 the strip is provided with a detent 38 punched inwardly (note Figs. 2 and 4). Such detents serve as stops for the longitudinal adjustment of the panel by engagement with the lip 32. The element 30 resiliently frictionally grips the rod 10 so snugly that manual longitudinal adjustment of the element over the rod is not readily accomplished but the element is manually rotatably adjustable about the rod and is adapted to resistingly retain its positions of rotatable adjustment.

Inasmuch as lip 32 of the element 30 is coupled with the panel through the strip 20 and the foundation board 14 the panel rotates with the element 30 about the rod and is maintained thereby at positions of angular adjustment with respect thereto. The engagement of this element with the panel is such that the panel itself is adjustable with respect to the element longitudinally of the rod. The end journals of the panel have portions 26 which frictionally engage the rod for maintaining positions of longitudinal adjustment. Cooperatively, therefore, the element 30 and the portions 26 of the end journals of the panel insure the panel being adjusted angularly as well as longitudinally with respect to its supporting rod.

What we claim is:

1. Visor mechanism comprising, in combination, a supporting rod, a visor panel provided along one margin with a tubular portion journaled directly upon the rod for rotation thereabout and longitudinal adjustment thereover and supporting the panel upon the rod, said tubular portion frictionally gripping the rod sufficiently tightly to retain the panel at positions of longitudinal adjustment along the rod but insufficiently to retain the panel at positions of rotatable adjustment about the rod, a split tube grippingly frictionally engaging the rod for resisted rotatable adjustment thereabout, one margin of said tube terminating in a radially projecting lip and the other margin of the split tube terminating in gripping engagement with the rod, said panel having means engaging the lip to rotate the tube with the panel about the rod tending to wrap the tube about the rod in one direction of rotation and tending to unwrap the tube in the opposite direction of rotation; said panel being freely adjustable longitudinally over said lip to permit adjustment of the panel longitudinally along the rod.

2. Visor mechanism comprising, in combination, a supporting rod, a visor panel provided along one margin with a metal strip having split tubular portions at each end grippingly frictionally journaled upon the rod supporting the panel thereupon for rotatable adjustment thereabout and longitudinal adjustment therealong, the frictional engagement of said tubular portions being sufficient to retain the panel at positions of longitudinal adjustment along the rod but insufficient to retain the panel at positions of rotatable adjustment about the rod, said strip being cut away between said tubular portions beyond the margin of the panel, a split tube frictionally gripping the rod between said tubular portions for resisted rotatable adjustment about the rod, said tube having one margin projecting outwardly radially forming a lip interposed between the panel and that portion of the strip extending between the tubular portions causing the split tube to rotate with the panel about the rod and tending to wrap the tube about the rod in one direction of rotation and to unwrap the tube in the opposite direction of rotation, the frictional engagement of said split tube with the rod being sufficient to hold the panel at adjusted positions about the rod, said panel being freely adjustable longitudinally over the lip of said split tube.

WALTER J. PELCHER.
ALTON J. DIROFF.